(12) United States Patent
Dooley

(10) Patent No.: US 9,378,026 B2  
(45) Date of Patent: Jun. 28, 2016

(54) CUSTOMIZABLE APPLICATION

(76) Inventor: Daniel A. Dooley, Hull, GA (US)

( * ) Notice: Subject to any disclaimer, the term of this patent is extended or adjusted under 35 U.S.C. 154(b) by 757 days.

(21) Appl. No.: 13/560,528

(22) Filed: Jul. 27, 2012

(65) Prior Publication Data

US 2014/0032640 A1 Jan. 30, 2014

(51) Int. Cl.
*G06F 9/44* (2006.01)
*H04L 29/08* (2006.01)
*G06F 9/445* (2006.01)

(52) U.S. Cl.
CPC .............. *G06F 9/4411* (2013.01); *G06F 8/61* (2013.01); *G06F 8/65* (2013.01); *H04L 67/34* (2013.01)

(58) Field of Classification Search
None
See application file for complete search history.

(56) References Cited

U.S. PATENT DOCUMENTS

| | | | |
|---|---|---|---|
| 8,726,234 B2 * | 5/2014 | Mital et al. ..................... 717/115 |
| 2002/0013939 A1 * | 1/2002 | Daynes et al. .................. 717/11 |
| 2002/0095656 A1 * | 7/2002 | Clark et al. ..................... 717/107 |
| 2003/0018964 A1 * | 1/2003 | Fox ............................ G06F 8/61 |
| | | | 717/177 |
| 2004/0088698 A1 * | 5/2004 | Claiborne ..................... 717/174 |
| 2004/0088700 A1 * | 5/2004 | Lee ............................ G06F 8/61 |
| | | | 717/178 |
| 2004/0249934 A1 * | 12/2004 | Anderson .................. G06F 8/65 |
| | | | 709/224 |
| 2005/0132348 A1 * | 6/2005 | Meulemans .............. G06F 8/65 |
| | | | 717/168 |
| 2005/0132349 A1 * | 6/2005 | Roberts ...................... G06F 8/65 |
| | | | 717/168 |
| 2005/0172284 A1 * | 8/2005 | Dandekar et al. ............. 717/175 |
| 2005/0289535 A1 * | 12/2005 | Murray et al. ................. 717/172 |
| 2006/0143601 A1 * | 6/2006 | Concha et al. ................ 717/170 |
| 2008/0313282 A1 * | 12/2008 | Warila ...................... G06F 8/24 |
| | | | 709/206 |
| 2009/0193410 A1 * | 7/2009 | Arthursson ......... G06F 9/45504 |
| | | | 717/173 |
| 2010/0131939 A1 * | 5/2010 | Hieb et al. .................... 717/169 |
| 2010/0228854 A1 * | 9/2010 | Morrison .............. H04L 67/125 |
| | | | 709/224 |
| 2010/0235433 A1 * | 9/2010 | Ansari .................... G06Q 30/04 |
| | | | 709/203 |
| 2010/0250649 A1 * | 9/2010 | Larsson et al. ................ 709/203 |
| 2010/0251340 A1 * | 9/2010 | Martin .................... G06F 21/51 |
| | | | 726/4 |
| 2012/0005666 A1 * | 1/2012 | Yonat ............................ 717/168 |

* cited by examiner

*Primary Examiner* — Ninos Donabed

(74) *Attorney, Agent, or Firm* — Smith Tempel Blaha LLC; Gregory Scott Smith

(57) ABSTRACT

An application that can include customized functionality that can be selectively enabled without disrupting the underlying operation of the application or requiring multiple instances or versions of the application that must be separately stored and maintained. An application is generally made available over a network for various users. A feature is provided that allows users to selectively activate one or more customized or specialized functions and/or features of the application such that the user gains access to a customized operation of the application without the application provider having to separately create and maintain multiple versions of the web application.

7 Claims, 20 Drawing Sheets

| Funds | | | Credit | Debit |
|---|---|---|---|---|
| Payment #1001 | Electricity | $896.00 | | |
| 77000-ANX-x-u | | | $458.00 | |
| 77000-KIT-x-u | | | $438.00 | |
| 10200 | | | | $896.00 |
| 10200-ANX-x-u | | | | $458.00 |
| 10200-KIT-x-u | | | | $438.00 |
| Payment #1002 | John Doe | $270.00 | | |
| 72000-ANX-800-t | | | $160.00 | |
| 75000-KIT-x-t | | | $52.60 | |
| 75000-ANX-x-u | | | $43.00 | |
| 70000-YOU-700-u | | | $14.40 | |
| 10200 | | | | $270.00 |
| 10200-ANX-800-t | | | | $160.00 |
| 10200-KIT-x-t | | | | $52.60 |
| 10200-ANX-x-u | | | | $43.00 |
| 10200-YOU-700-u | | | | $14.40 |
| Receipt #5000 | Jane Roe | $650.00 | | |
| 40000-CHI-200-t | | | | $200.00 |
| 40000-BEN-600-u | | | | $250.00 |
| 40000-YOU-100-u | | | | $200.00 |
| 10200 | | | $650.00 | |
| 10200-CHI-200-t | | | $200.00 | |
| 10200-BEN-600-u | | | $250.00 | |
| 10200-YOU-100-u | | | $200.00 | |
| Receipt #5001 | Sally Snow | $800.00 | | |
| 40000-MIS-300-u | | | | $450.00 |
| 40000-CHA-500-t | | | | $350.00 |
| 10200 | | | $800.00 | |
| 10200-MIS-300-u | | | $450.00 | |
| 10200-CHA-500-t | | | $350.00 | |
| Payment #1003 | Harry Crow | $278.50 | | |
| 70000-YOU-200-u | | | $120.40 | |
| 72000-ANX-200-t | | | $98.04 | |
| 72000-ANX-800-t | | | $60.06 | |
| 10200 | | | | $278.50 |
| 10200-YOU-200-u | | | | $120.40 |
| 10200-ANX-200-t | | | | $98.04 |
| 1020-ANX-800-t | | | | $60.06 |
| Receipt #5002 | Freddy Lowe | $420.00 | | |
| 40000-CHI-200-t | | | | $200.00 |
| 40000-CHI-800-u | | | | $220.00 |

505 (Payment #1001 block)
510 (Payment #1002 block)

FIG. 5

Organization
Balance Sheet
16-Feb-10

| | Beginning | Transactions | | Ending | |
|---|---|---|---|---|---|
| | | Debit | Credit | | |
| Current Assets | | | | | |
| Regular Checking Account | $13,390.00 | $425.50 | | $13,815.50 | |
| Savings Account | $9,400.00 | | | $9,400.00 | |
| Total Current Assets | | $22,790.00 | | | $23,215.50 |
| Fixed Assets | | | | | |
| Furniture & Fixtures | $42,246.00 | | | $42,246.00 | |
| Building | $306,548.00 | | | $306,548.00 | |
| Total Fixed Assets | | $348,794.00 | | | $348,794.00 |
| Total Assets | | $371,584.00 | | | $372,009.50 |
| Current Liabilities | | | | | |
| Accounts Payable | $2,546.00 | | | $2,546.00 | |
| Credit Card Payable | $856.00 | | | $856.00 | |
| Total Current Liabilities | | $3,402.00 | | | $3,402.00 |
| Long-Term Liabilities | | | | | |
| N/P - Bank of America | $42,546.00 | | | $42,546.00 | |
| N/P - Suntrust | $12,546.00 | | | $12,546.00 | |
| Total Long-Term Liabilities | | $55,092.00 | | | $55,092.00 |
| Total Liabilities | | $58,494.00 | | | $58,494.00 |
| Equity | | | | | |
| Retained Earnings | $315,545.00 | | | $315,545.00 | |
| Net Income | ($2,455.00) | | $425.50 | ($2,029.50) | |
| Total Equity | | $313,090.00 | | | $313,515.50 |
| Total Liabilities & Equity | | $371,584.00 | | | $372,009.50 |

Transaction Balance = $0

FIG. 6

FUND
Missions
Balance Sheet
16-Feb-10

| | Beginning | | Transactions | | Ending | |
|---|---|---|---|---|---|---|
| | | | Debit | Credit | | |
| Current Assets | | | | | | |
| Regular Checking Account | $2,500.00 | | $450.00 | | $2,950.00 | |
| Savings Account | $4,800.00 | | | | $4,800.00 | |
| Total Current Assets | | $7,300.00 | | | | $7,750.00 |
| Total Assets | | $7,300.00 | | | | $7,750.00 |
| Equity | | | | | | |
| Net Income | $7,300.00 | | | $450.00 | $7,750.00 | |
| Total Equity | | $7,300.00 | | | | $7,750.00 |
| Total Liabilities & Equity | | $7,300.00 | | | | $7,750.00 |

Transaction Balance = $0

| | | Beginning | Transactions | | Ending |
|---|---|---|---|---|---|
| | FUND Charity Balance Sheet 16-Feb-10 | | Debit | Credit | |
| Current Assets | | | | | |
| Regular Checking Account | | $550.00 | $350.00 | | $900.00 |
| Savings Account | | $0.00 | | | $0.00 |
| Total Current Assets | | $550.00 | | | $900.00 |
| Total Assets | | $550.00 | | | $900.00 |
| Equity | | | | | |
| Net Income | | $550.00 | | $350.00 | $900.00 |
| Total Equity | | $550.00 | | | $900.00 |
| Total Liabilities & Equity | | $550.00 | | | $900.00 |
| | | | Transaction Balance = $0 | | |

FUND
Annex
Balance Sheet
16-Feb-10

|  | Beginning | | Transactions | | Ending | |
| --- | --- | --- | --- | --- | --- | --- |
|  |  |  | Debit | Credit |  |  |
| Current Assets |  |  |  |  |  |  |
| Regular Checking Account | $4,880.00 |  |  | $819.10 | $4,060.90 |  |
| Savings Account | $400.00 |  |  |  | $400.00 |  |
| Total Current Assets |  | $5,280.00 |  |  |  | $4,460.90 |
| Fixed Assets |  |  |  |  |  |  |
| Furniture & Fixtures | $10,220.00 |  |  |  | $10,220.00 |  |
| Building | $64,465.00 |  |  |  | $64,465.00 |  |
| Total Fixed Assets |  | $74,685.00 |  |  |  | $74,685.00 |
| Total Assets |  | $79,965.00 |  |  |  | $79,145.90 |
| Long-Term Liabilities |  |  |  |  |  |  |
| N/P - Bank of America | $42,546.00 |  |  |  | $42,546.00 |  |
| Total Long-Term Liabilities |  | $42,546.00 |  |  |  | $42,546.00 |
| Total Liabilities |  | $42,546.00 |  |  |  | $42,546.00 |
| Equity |  |  |  |  |  |  |
| Retained Earnings | $31,416.00 |  |  |  | $31,416.00 |  |
| Net Income | $6,003.00 |  | $819.10 |  | $5,183.90 |  |
| Total Equity |  | $37,419.00 |  |  |  | $36,599.90 |
| Total Liabilities & Equity |  | $79,965.00 |  |  |  | $79,145.90 |

Transaction Balance = $0

FUND
Kitchen
Balance Sheet
16-Feb-10

| | Beginning | | Transactions | | Ending | |
|---|---|---|---|---|---|---|
| | | | Debit | Credit | | |
| Current Assets | | | | | | |
| Regular Checking Account | $1,400.00 | | | $490.60 | $909.40 | |
| Savings Account | $400.00 | | | | $400.00 | |
| Total Current Assets | | $1,800.00 | | | | $1,309.40 |
| Fixed Assets | | | | | | |
| Furniture & Fixtures | $8,422.00 | | | | $8,422.00 | |
| Building | $18,110.00 | | | | $18,110.00 | |
| Total Fixed Assets | | $26,532.00 | | | | $26,532.00 |
| Total Assets | | $28,332.00 | | | | $27,841.40 |
| Long-Term Liabilities | | | | | | |
| N/P -Suntrust | $12,546.00 | | | | $12,546.00 | |
| Total Long-Term Liabilities | | $12,546.00 | | | | $12,546.00 |
| Total Liabilities | | $12,546.00 | | | | $12,546.00 |
| Equity | | | | | | |
| Retained Earnings | $12,488.00 | | | | $12,488.00 | |
| Net Income | $3,298.00 | | $490.60 | | $2,807.40 | |
| Total Equity | | $15,786.00 | | | | $15,295.40 |
| Total Liabilities & Equity | | $28,332.00 | | | | $27,841.40 |

Transaction Balance = $0

FIG. 11

| FUND<br>Youth<br>Balance Sheet<br>16-Feb-10 | Beginning | | Transactions<br>Debit | Credit | Ending | |
|---|---|---|---|---|---|---|
| Current Assets | | | | | | |
| Regular Checking Account | $1,600.00 | | $65.20 | | $1,665.20 | |
| Savings Account | $2,800.00 | | | | $2,800.00 | |
| Total Current Assets | | $4,400.00 | | | | $4,465.20 |
| Total Assets | | $4,400.00 | | | | $4,465.20 |
| Equity | | | | | | |
| Net Income | | | | $65.20 | | $4,465.20 |
| Total Equity | | $4,400.00 | | | | $4,465.20 |
| Total Liabilities & Equity | | $4,400.00 | | | | $4,465.20 |
| | | | Transaction Balance = $0 | | | |

FIG. 12

| | FUND<br>Children<br>Balance Sheet<br>16-Feb-10 | | | | | |
|---|---|---|---|---|---|---|
| | Beginning | | | Transactions | | Ending |
| | | | | Debit | Credit | |
| Current Assets | | | | | | |
| Regular Checking Account | $1,500.00 | | | $620.00 | | $2,120.00 |
| Savings Account | $1,000.00 | | | | | $1,000.00 |
| Total Current Assets | | $2,500.00 | | | | $3,120.00 |
| Total Assets | | $2,500.00 | | | | $3,120.00 |
| Equity | | | | | | |
| Net Income | | $2,500.00 | | | $620.00 | $3,120.00 |
| Total Equity | | $2,500.00 | | | | $3,120.00 |
| Total Liabilities & Equity | | $2,500.00 | | | | $3,120.00 |
| | | | Transaction Balance = $0 | | | |

FIG. 13

FUND
Benelovence
Balance Sheet
16-Feb-10

|  | Beginning | | Transactions | | Ending | |
|---|---|---|---|---|---|---|
|  | | | Debit | Credit | | |
| Current Assets | | | | | | |
| Regular Checking Account | $960.00 | | $250.00 | | $1,210.00 | |
| Savings Account | $0.00 | | | | $0.00 | |
| Total Current Assets | | $960.00 | | | | $1,210.00 |
| Total Assets | | $960.00 | | | | $1,210.00 |
| Equity | | | | | | |
| Net Income | $960.00 | | | $250.00 | $1,210.00 | |
| Total Equity | | $960.00 | | | | $1,210.00 |
| Total Liabilities & Equity | | $960.00 | | | | $1,210.00 |

Transaction Balance = $0

FIG. 14

FUND
Discipleship Training
Balance Sheet
16-Feb-10

| | | Beginning | | Transactions | | Ending |
|---|---|---|---|---|---|---|
| | | | | Debit | Credit | |
| Current Assets | | | | | | |
| | Regular Checking Account | $1,880.00 | | $200.00 | | $2,080.00 |
| | Savings Account | $0.00 | | | | $0.00 |
| | Total Current Assets | | $1,880.00 | | | $2,080.00 |
| | Total Assets | | $1,880.00 | | | $2,080.00 |
| Equity | | | | | | |
| | Net Income | $1,880.00 | | | $200.00 | $2,080.00 |
| | Total Equity | | $1,880.00 | | | $2,080.00 |
| | Total Liabilities & Equity | | $1,880.00 | Transaction Balance = $0 | | $2,080.00 |

FIG. 15

FUND
Russia Trip
Balance Sheet
16-Feb-10

| | Beginning | Transactions | | Ending |
|---|---|---|---|---|
| | | Debit | Credit | |
| Current Assets | | | | |
| Regular Checking Account | $2,500.00 | $450.00 | | $2,950.00 |
| Savings Account | $0.00 | | | $0.00 |
| Total Current Assets | $2,500.00 | | | $2,950.00 |
| Total Assets | $2,500.00 | | | $2,950.00 |
| Equity | | | | |
| Net Income | $2,500.00 | | $450.00 | $2,950.00 |
| Total Equity | $2,500.00 | | | $2,950.00 |
| Total Liabilities & Equity | $2,500.00 | | | $2,950.00 |
| | | Transaction Balance = $0 | | |

FIG. 16

| FUND<br>Heart Ministries<br>Balance Sheet<br>16-Feb-10 | Beginning | Transactions | | Ending |
|---|---|---|---|---|
| | | Debit | Credit | |
| Current Assets | | | | |
| Regular Checking Account | $1,330.00 | $350.00 | | $1,680.00 |
| Savings Account | $0.00 | | | $0.00 |
| Total Current Assets | $1,330.00 | | | $1,680.00 |
| Total Assets | $1,330.00 | | | $1,680.00 |
| Equity | | | | |
| Net Income | $1,330.00 | | $350.00 | $1,680.00 |
| Total Equity | $1,330.00 | | | $1,680.00 |
| Total Liabilities & Equity | $1,330.00 | Transaction Balance = $0 | | $1,680.00 |

FIG. 17

| FUND Tom Hall Fund Balance Sheet 16-Feb-10 | Beginning | | Transactions | | Ending | |
| --- | --- | --- | --- | --- | --- | --- |
| | | | Debit | Credit | | |
| Current Assets | | | | | | |
| Regular Checking Account | $960.00 | | $250.00 | | $1,210.00 | |
| Savings Account | $0.00 | | | | $0.00 | |
| Total Current Assets | | $960.00 | | | | $1,210.00 |
| Total Assets | | $960.00 | | | | $1,210.00 |
| Equity | | | | | | |
| Net Income | $960.00 | | | $250.00 | $1,210.00 | |
| Total Equity | | $960.00 | | | | $1,210.00 |
| Total Liabilities & Equity | | $960.00 | | | | $1,210.00 |
| | | | Transaction Balance = $0 | | | |

| | | FUND Penfield Ministries Balance Sheet 16-Feb-10 | | | | |
|---|---|---|---|---|---|---|
| | | Beginning | | Transactions | | Ending |
| | | | | Debit | Credit | |
| Current Assets | | | | | | |
| | Regular Checking Account | $1,220.00 | | | $14.40 | $1,205.60 |
| | Savings Account | $0.00 | | | | $0.00 |
| | Total Current Assets | | $1,220.00 | | | $1,205.60 |
| | Total Assets | | $1,220.00 | | | $1,205.60 |
| Equity | | | | | | |
| | Net Income | $1,220.00 | | $14.40 | | $1,205.60 |
| | Total Equity | | $1,220.00 | | | $1,205.60 |
| | Total Liabilities & Equity | | $1,220.00 | | | $1,205.60 |
| | | | | Transaction Balance = $0 | | |

| FUND Awana's Balance Sheet 16-Feb-10 | Beginning | | Transactions | | Ending | |
|---|---|---|---|---|---|---|
| | | | Debit | Credit | | |
| Current Assets | | | | | | |
| Regular Checking Account | $2,900.00 | | | $0.06 | $2,899.94 | |
| Savings Account | $200.00 | | | | $200.00 | |
| Total Current Assets | | $3,100.00 | | | | $3,099.94 |
| Fixed Assets | | | | | | |
| Furniture & Fixtures | $4,600.00 | | | | $4,600.00 | |
| Total Fixed Assets | | $4,600.00 | | | | $4,600.00 |
| Total Assets | | $7,700.00 | | | | $7,699.94 |
| Equity | | | | | | |
| Retained Earnings | $2,000.00 | | | | $2,000.00 | |
| Net Income | $5,700.00 | | $0.06 | | $5,699.94 | |
| Total Equity | | $7,700.00 | | | | $7,699.94 |
| Total Liabilities & Equity | | $7,700.00 | | | | $7,699.94 |
| | | | Transaction Balance = $0 | | | |

| FUND VBS Balance Sheet 16-Feb-10 | | | Transactions | | | |
|---|---|---|---|---|---|---|
| | | Beginning | Debit | Credit | Ending | |
| Current Assets | | | | | | |
| | Regular Checking Account | $2,600.00 | $181.56 | | $2,781.56 | |
| | Savings Account | $0.00 | | | $0.00 | |
| | Total Current Assets | $2,600.00 | | | $2,781.56 | |
| | Total Assets | $2,600.00 | | | $2,781.56 | |
| Equity | | | | | | |
| | Net Income | $2,600.00 | | $181.56 | $2,781.56 | |
| | Total Equity | $2,600.00 | | | $2,781.56 | |
| | Total Liabilities & Equity | $2,600.00 | | | $2,781.56 | |
| | | | Transaction Balance = $0 | | | |

FIG. 20

CUSTOMIZABLE APPLICATION

BACKGROUND

The advent of network applications, in many ways, has changed the software industry significantly. In network applications, a user utilizing either a client system or a web browser software package may access the network application over an internet connection, connecting the user's client with an application server. Two huge impacts were realized with the advent of network applications. One was the near annihilation of having to distribute applications via various media and physical delivery, and another impact was the ease in updating and maintaining the applications. Rather than having to redistribute new versions of the application, the application can be updated on the internet server and subsequent invocations of the application automatically operate the updated version.

A huge issue that must be dealt with in the software industry is customization of an application for a particular business or other uses. Just like any mass produced and/or distributed market, customization either cuts into the profits or requires a price increase. In the software industry, this phenomenon exits for media delivered applications as well as web based applications. To provide customized network applications, multiple instances of the application must exist, be maintained and utilize server storage and processing resources. What is needed in the art is a technique to provide customized features for application clients that can alleviate the maintenance issues involved in maintaining multiple versions of customized applications.

BRIEF SUMMARY

The present disclosure presents a novel technique for the provision of web-based applications or web-centric application that include customized features or aspects that can be individually and selectively enabled by a user of an application client accessing such web based applications without requiring the application provider to maintain and track multiple versions of the web-based applications and/or the application clients accessing or running in conjunction with the web based applications. In general, by simply providing the ability for the user of the application client to selectively enable or disable custom features or aspects of the application, the software provider can update the application to include customized features, instruct the user on how to access the features, and then if the features are accessed by a user, the software provider can, if so desired, charge a premium for the use of the customized features.

One non-limiting exemplary embodiment presented in the disclosure is a solution that provides a web-based application that is executed on an application client and that can include customized functionality without disrupting the underlying operation of the web-based application or the application client, and alleviating some of the requirements for maintaining and supporting multiple instances or versions of the web application. Initially, a user can access a web-based application utilizing an application client, by invoking the application over the internet or some other network to connect with a specified server housing one or more components of the web-based application. Once invoked, some of the business logic required to run the application can be loaded into the application client from the server. For purposes of this disclosure, the term web-based application will be described as an application client that runs or executes an application but that initially obtains one or more components for the application from a server or servers that are accessed via a network, such as the World Wide Web or some other network including local area networks, wide area networks, or the like.

Initially, the user of the application client executes the application by invoking it on the user's computer. This invocation results in the operating system then invoking a JAVA virtual machine which loads and runs the application. Once the application is loaded, such as by loading components from the application client, the server or a combination of both, the application then loads the business logic. Once the business logic is loaded and any pertinent data is retrieved from the server, the application client can render the application content which typically includes graphical user interface screens with various data fields, function keys, etc. The user can then interact with the application client on their own machine by actuating function keys, entering or modifying date, or the like. The actuation of the function keys and/or entering data can invoke further interaction with the server in which commands or modified data is transferred from the application client to the server. One of the functions that can be included in the rendering of the application to the user is the ability to activate a customized function. The customized function may be a function that others have caused to be created and is now accessible to other users or, it may be a function that the user has requested of the application provider. In operation, the user can activate the function by providing an indicator, such as selecting what is referred to in this description as a Logic Key. When the server receives the commands and/or data from the application client, if the Logic Key is enabled, the server can operate to load new business logic into the application client to implement the functionality associated with the Logic Key. Thus, it will be appreciated that such a technique allows the application provider to offer customized or enhanced functionality to a user of the application while still maintaining the standard functionality of the application for other users. Further, the application provider only has one version of the web-based application to maintain as all of the business logic to be loaded into various application clients can be included within the server and selectively loaded to application clients based on the presence or absence of Logic Keys being enabled or selected.

The functionality provided by the use of Logic Keys can be quite varied. In some embodiments, the Logic Key may be utilized to enable a feature that is available throughout the application. In other embodiments, the feature may only operate on a certain limited area of the application. For instance, a non-limiting example of such a feature may result in the need to create additional data fields for storing, sorting and housing user data. In such an embodiment, the business logic, once loaded into the application client, can result in the modification of the look and feel of the rendered application from the user's view, and/or create additional data fields to be stored in a database accessed by the server supporting the web-based application and communicating with the application client.

For instances in which a user desires a customized feature, the user can provide a functional description of the feature to the application provider or, the functional description could be provided by others including the application provider itself. The application provider can then create the software or algorithm and/or business logic necessary to perform the defined functions or provide the described feature. When the business logic subsequently gets loaded into the application client, the business logic can include the new algorithm, if and when the user enables the Logic Key.

Even further, the customization of the functions or features provided to users of the application can be further granularized by allowing the user to not only enable a Logic Key, but also to provide parameters that can control aspects of the operation of the function. In some embodiments, certain features and functions can be made available to all users, whereas in other embodiments, features and functions may require a user to send credentials or have credentials examined to determine if the user can access the features and functions of the application. In yet other embodiments, a mixture of both types of features and/or functions can be provided, open access functions and those that require certain credentials. Further, the features and/or functions may also, when enabled, trigger the increase in fees charged for the use of the application. Similarly, by disabling such features and/or functions, the fee for use of the web-based application can be decreased.

These embodiments, features and aspects are further described in the following detailed description and the figures.

BRIEF DESCRIPTION OF THE SEVERAL VIEWS OF THE DRAWING

FIG. 5 is a table showing the allocation of funds received into the organization as cash contributions.

FIG. 6-FIG. 20 illustrate exemplary balance sheets that can be automatically generated by the accounting system for a segment that is marked with the virtual account Logic Key.

DETAILED DESCRIPTION OF EMBODIMENTS OF THE INVENTION

This description is related to and is directed towards a functional utility that can be incorporated into a variety of systems to enable the provision of customizable functions or functionality to the overall system without having to rewrite or recode the entire application. Although the various aspects, features and embodiments presented in this description are within the environment of a web-based or web-centric accounting and general ledger system, it will be appreciated that such environment is only one, non-limiting example of an environment that is suitable for various embodiments, configurations and implementations of the functional utility.

The functional utility presented in this description is referred to as the Logic Key. At a very high level, the Logic Key is an element that a user or program can activate, identify or associate with an application or a segment, function or portion of an application and once activated, identified and/or associated, adds additional logical functionality or features to the application or segment, function or portion of the application.

The Logic Key can be incorporated into a variety of systems, settings and architectures. This description presents as a non-limiting example, a specific architecture and system in which to describe the operation of the Logic Key. As such, the particular environment and the described embodiment does not limit the application and scope of the Logic Key.

Figure 1:
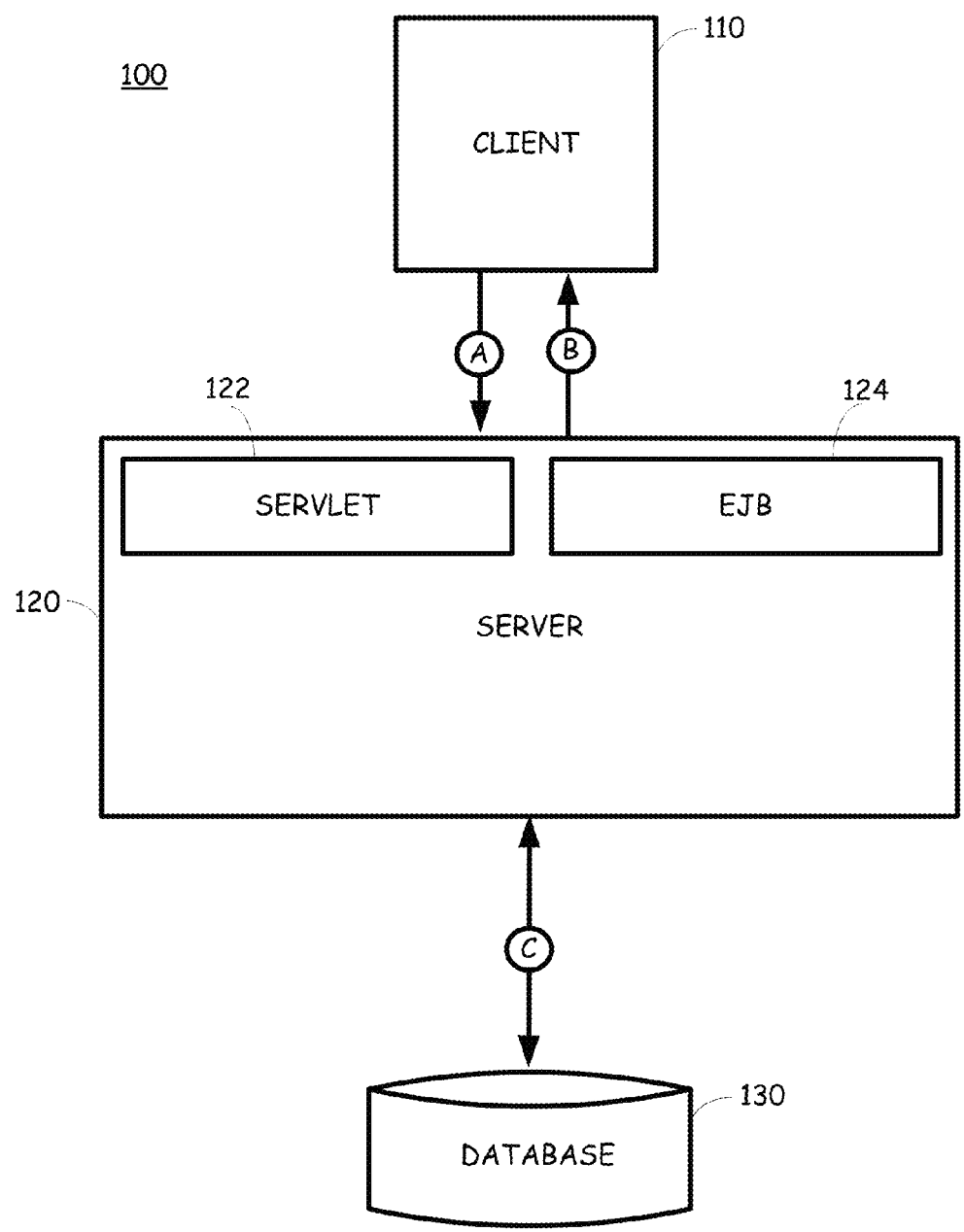
FIG. 1 is a non-limiting example of an environment in which the Logic Key can be implemented.

FIG. 1 is a non-limiting example of an environment in which the Logic Key can be implemented. The environment illustrated in FIG. 1 is a client-server application environment 100 which includes the components of an application client 110, a server 120 and a database 130. The application client 110 communicates information to the server 120 over communication path A and receives communicated information from the server 120 over communication path B. The communication protocol used between the application client 110 and the server 120 preferably enables a secured communication path but, it should be appreciated that in some embodiments, an unsecured communication path may also be utilized. To secure the communication path, a protocol such as HTTPS can be utilized as a non-limiting example. HTTPS, which is an acronym for Hypertext Transfer Protocol over SSL, is a protocol utilizing TCP to transfer hypertext requests and information between servers and browsers. When HTTP utilizes SSL, which is an acronym for Secure Socket Layer, or TLS (Transport Layer Security), the protocol is referred to as HTTPS. Thus, in the illustrated example, communication between the application client 110 and the server 120 is conducted by a combination of hypertext transfer protocol and SSL/TSL. The use of this protocol provides encrypted communication and secure identification of a network web server. HTTPS connections are used in many situations in which sensitive information is being communicated. For instance, HTTPS is frequently used for payment transactions on the world wide web as well as other connections in which sensitive information may be communicated. The detailed operation of HTTPS and the involvement between the various communication network layers is not addressed in detail in this description as those of ordinary skill in the relevant art will be familiar with the technical aspects of HTTPS. As such, only a high-level overview of the technology is presented. For purposes of this description, in the illustrated embodiment HTTPS provides data privacy for information that is communicated between the application client 110 and the server 120 and enforces client authentication to limit access to the server 120 to authorized users.

In the TCP/IP protocol stack, the SSL protocol sits between the TCP/IP layer protocol and the higher application-level protocols such as HTTP or SMTP. The SSL based implementation calls TCP/IP on behalf of the application, and it allows the SSL-enabled server and the SSL-enabled client to authenticate to each other and establish the encrypted connection between the two endpoints.

Use of SSL server authentication allows a user to confirm a server's identity. An application client that incorporates SSL-enabled software can use standard techniques of public-key cryptography to check that a server's certificate and public ID are valid and have been issued by a certificate authority listed in the client's list of trusted CAs. Such authentication is important from a user's perspective prior to transmitting valuable and sensitive information to the server over the network.

The use of SSL client authentication allows a server to confirm a user's identity. Using the same techniques as those for server authentication, a server that includes SSL-enabled software or web application can check that a client's certificate and public ID are valid and have been issued by a CA in the server's list of trusted CAs. Such confirmation is important if the server will be sending confidential information to the client and wants to verify the identity of the receiving client prior to the transmission of the information.

By using HTTPS, as in the illustrated example, an encrypted SSL connection results in all of the information sent between a application client 110 and a server 120 being encrypted by the sending entity and decrypted by the receiving entity.

It should be appreciated that other techniques can be used to provide the secured transmission of data and client/server authentication and that the use of HTTPS is only one non-limiting example. For instance, closed networks, closed communication channels, static signing, manual encryption, VPNs, etc. could also be utilized In describing an exemplary environment for implementing the Logic Key, the environment is presented as being based on Enterprise JAVA or J2EE technology. Further the exemplary target application for the various embodiments of the Logic Key is being described as a full-function accounting, bookkeeping and ledger system (the accounting system). The underlying accounting system, is thus described as a J2EE application that is broken down into three tiers as illustrated in FIG. 1, with the three entities being the application client 110 (client tier), the J2EE server 120 (web and business tier) and a database 130 (EIS tier).

As the ordinary person skilled in the art will be aware, the J2EE clients can be web clients or application clients. Web clients are generally described as being thin clients meaning that they do not query databases, execute complex business rules or connect with legacy applications. Application clients, on the other hand, are described as fat clients, run on a client machine and provide a richer user interface. Typically, such interfaces include a graphical user interface (GUI) created from the Swing or the Abstract Window Toolkit (AWT) API. When either configuration is utilized, these types of operations are generally performed by enterprise beans executing on the J2EE server.

In typical J2EE based architectures, Javabeans are employed to manage the data flow between an application client and the components that are running on the J2EE server. Similarly, Javabeans are used to manage data flow between the J2EE server and the database.

The present disclosure presents the accounting system as being structured in accordance with an application client model and as such, the client is described as a fat client. However, it will be appreciated that such illustrations are provided for the purpose of understanding the various embodiments of the Logic Key through analyzing a concrete example and, such illustrations should not be construed in any way to limit the present invention.

Figure 2:
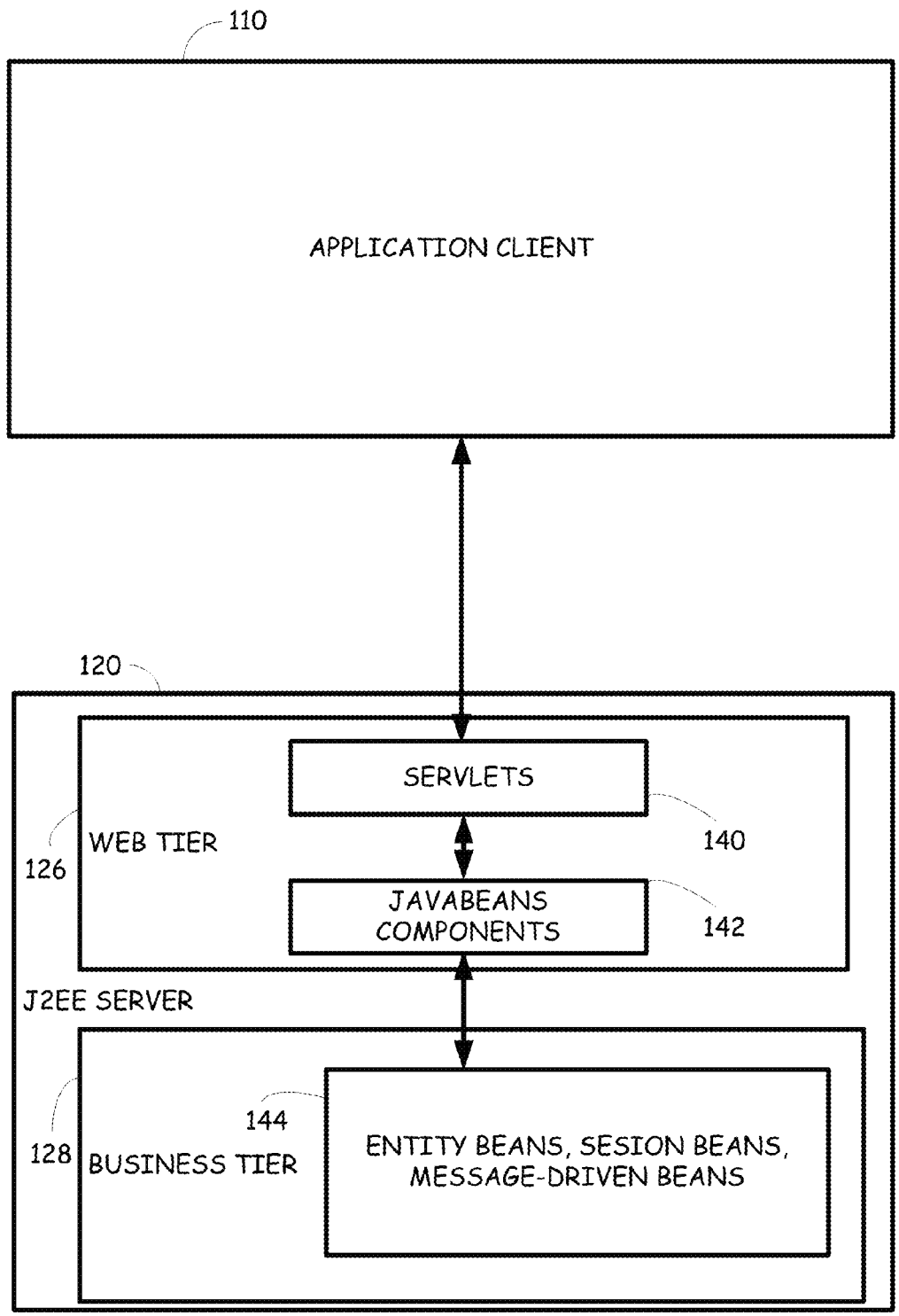
FIG. 2 is a block diagram illustrating the components of a typical web client residing in a J2EE based architecture.

FIG. 2 is a block diagram illustrating the components of a typical web server residing in a J2EE based architecture. The typical application client runs on a client machine and provides a way for users to handle tasks that require a richer user interface than can be provided by a markup language. It typically has a graphical user interface (GUI) created from the Swing or the Abstract Window Toolkit (AWT) API, but a command-line interface is certainly possible. Application clients directly access enterprise beans 144 running in the business tier. However, if application requirements warrant it, an application client can open an HTTP connection to establish communication with a servlet 140 running in the web tier. In a particular embodiment, the application client is based on a java program, with a GUI rendered through Java Swing, that communicates with the server. The web tier consists only of servlets and the business tier consists of the beans.

The application client 110 communicates with the business tier 128 running on the server through the servlets 140 that are residing in the web tier 126 and JavaBeans components 142 that interface to the enterprise beans 144 residing in the business tier 128 on the server 120. Other details of the J2EE architecture and the deployment and development of entities within such an environment are known in the art and further detail is not presented herein.

As previously stated, the various embodiments, aspects and features of the Logic Key are presented herein in a J2EE server based environment utilizing an application client that includes a graphical user interface based on the SWING GUI library. The graphical user interface (GUI) includes frames and panels.

Figure 3:
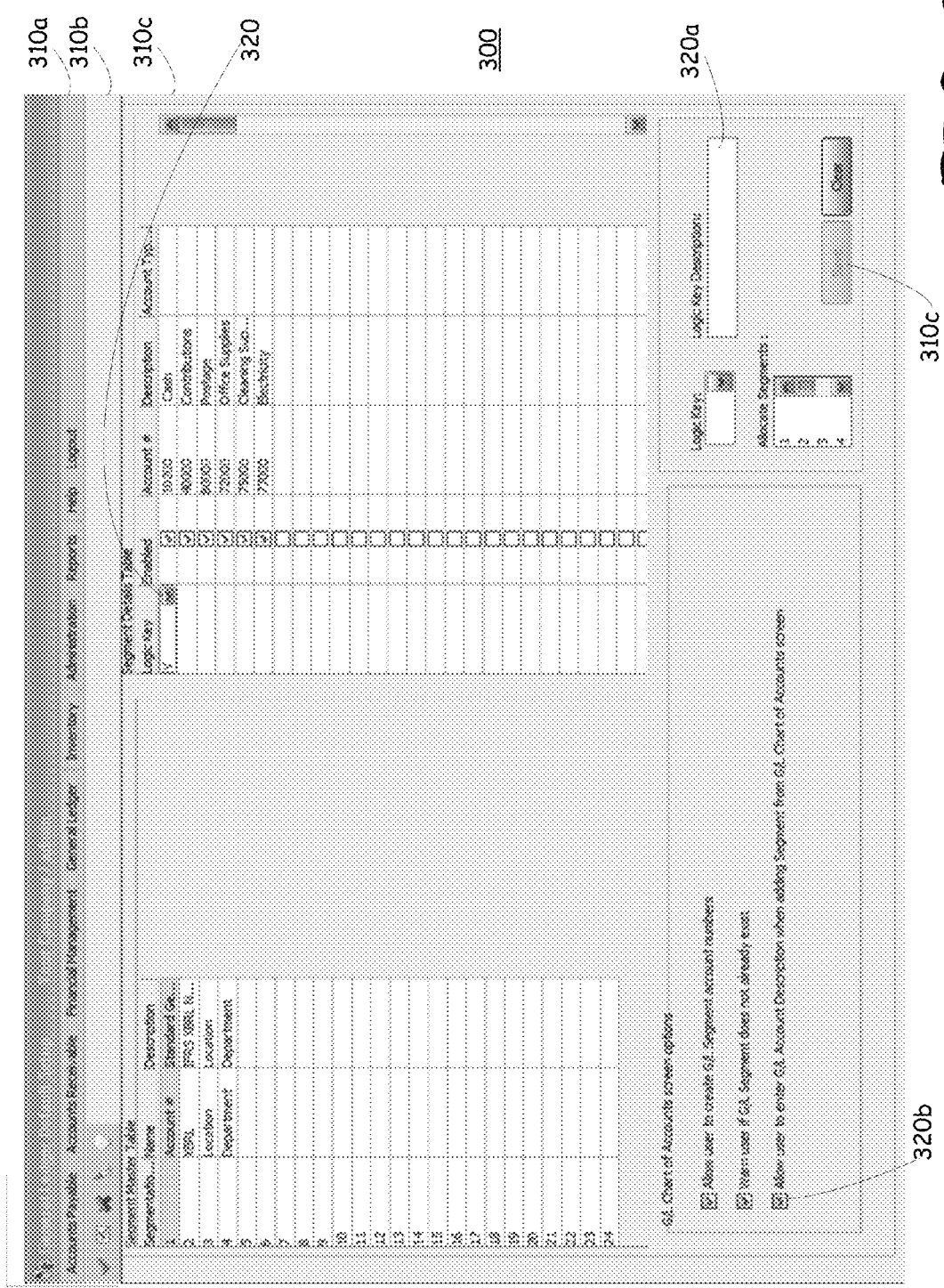
FIG. 3 is partial view of an exemplary screen structure selected from many available screen structures for the accounting system application serving as an environment for an embodiment of the Logic Key.

FIG. 3 is partial view of an exemplary screen structure selected from many available screen structures for the accounting system application serving as an environment for an embodiment of the Logic Key. The screen view is based on SWING and Java Foundation classes, but other design technologies could be employed. The illustrated screen consists of various elements constructed using a jframe and jpanel classes. The jframe is the physical window that is illustrated on the screen 300. The jpanel defines the various components that are included in the screen. The screen can include a variety of formats such as an online form, etc. The jpanels are containers for the components. The various frames 310a, 310b and 310c are presented on the screen 300 and then the components for each jframe are then added to the jpanel. Various component types can be presented, such as jbuttons, jlabels, radial buttons, text boxes, etc. In general, as a user actuates the various jpanel components, the state of the components can change, such as adding text in a box 320a, toggling a radial button or check box 320b etc. Once items are modified on the screen, the user can actuate the save panel 320c which causes the transmission of the data or actuations to be sent from the web client 110 to the server 120 and for updating the database 130. When the save panel 320c is actuated, this information is transferred over communication path A (FIG. 1) to the servlets 140 and invokes JavaBeans 144 in the business tier 128 of the server 120. The business tier 128 also includes one or more JavaBeans for controlling communication with the database 130. In general, the screen 300 is constructed such that there is a servlet per menu and a JavaBean per menu item as a non-limiting example.

Logic Key Implementation

The implementation of the Logic Key is now presented in the exemplary environment of the J2EE server running with an application client (fat client). The ordinary person skilled in the art will understand that the real work is performed by the enterprise JavaBeans. The business logic for performing various tasks resides in the enterprise JavaBeans and the client. The menu items can be enabled or disabled, visible or hidden depending on business logic and login credentials. The Logic Key is housed within the database 130 along with the accounts for the account system. At startup, the application client retrieves the tables and data and then the user can review and/or update the data. The data is updated in the database 130 by the server 120 upon the user actuating the SAVE button.

Figure 4:
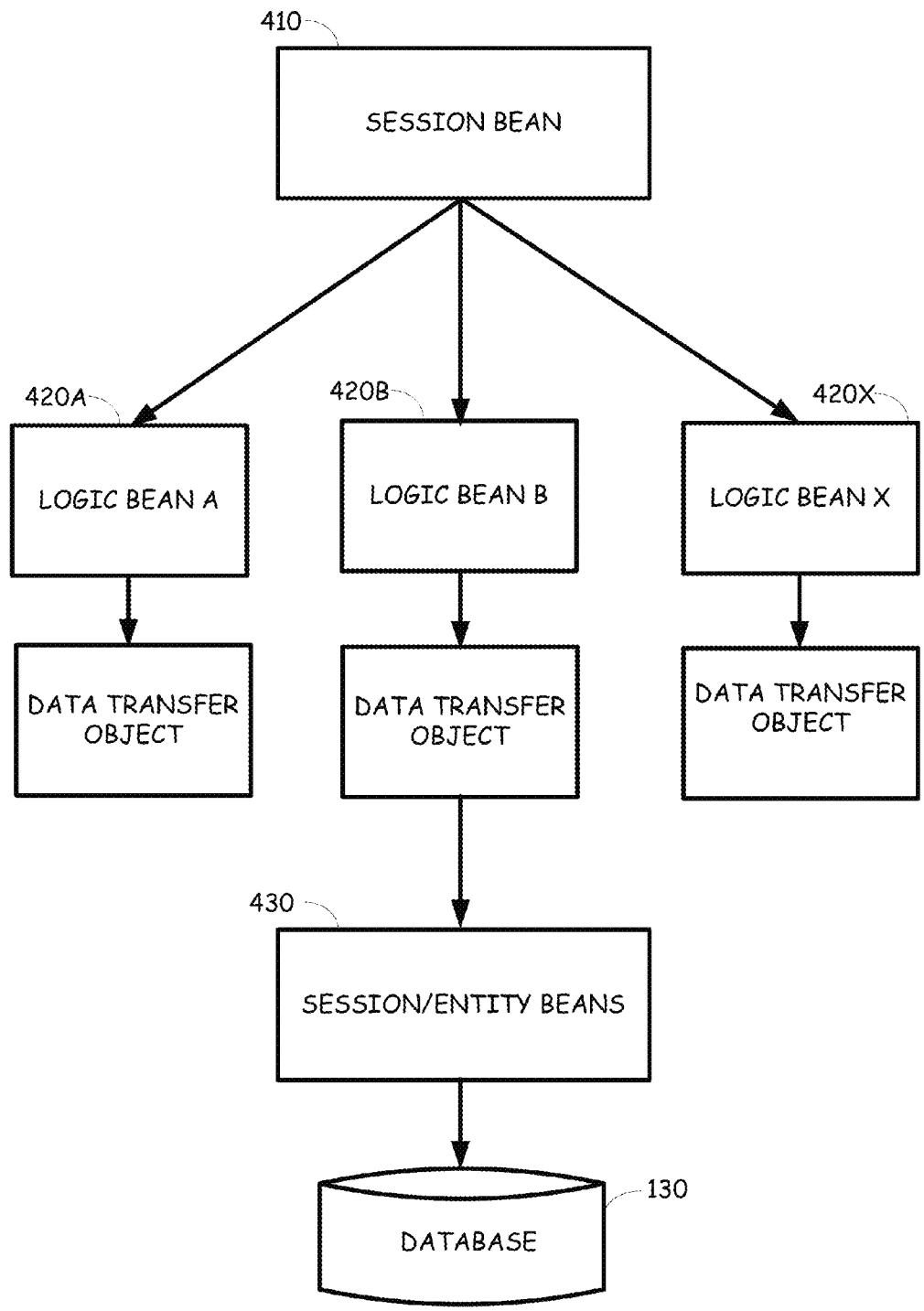
FIG. 4 is a conceptual diagram illustrating the implementation of the server side logic for implementing the Logic Key.

FIG. 4 is a conceptual diagram illustrating the implementation of the server side logic for implementing the Logic Key. The servlet 410, which resides in the server 120 contains business logic and it operates in conjunction with various entity beans (LOGIC BEAN A 420A, LOGIC BEAN B 420B . . . LOGIC BEAN X 420X). The application client 110 initially loads the screen and retrieves any necessary data records from the database 130 through the server 120. Once loaded, the user can actuate various fields in the screen. When the user actuates the panels, actions local to the application client 110 may be invoked and/or actions that involve the use of the JavaBeans in the server 120 may be invoked. For instance, if the user modifies a text field, this is completely contained within the web client 110. However, if the user actuates the SAVE panel, the information is transferred to the servlet (Session Bean) 410 which then talks to the various entity beans 420A, 420B-420X as necessary for updating the table and ultimately the server 120 uses one or more other JavaBeans 430 to update the database 130. It should be appreciated that although just one servlet 410 is illustrated, when the user actuates any action panel, such as the SAVE panel, the action may interact with any number of servlets depending on the tasks that need to be performed.

The database contains the storage for the various underlying data that is associated with the various fields. The Logic Key is simply a field that is stored along with the various tables and data. When the user activates a Logic Key, the fact that the Logic Key is activated is stored along with the tables but, does not operate to modify the structure of the data in anyway other than to indicate that the Logic Key is active. The Logic Key is acted upon by the client logic which operates to interpret the data in the tables based on the state of the Logic Key.

As such, when it is desired to create a customization, or to add new capabilities to the system, the Logic Key can be defined and the underlying business logic to implement the functions associated with the Logic Key can be created. The functions can be performed either completely in the client logic, the JavaBeans or a combination of both. For an application client oriented implementation, as the data is received from the server 120, the application client 110 operates on and renders the data in accordance with the state of the Logic Key and the business logic associated with the Logic Key. Likewise, as the data is modified, the application client 110 performs actions in accordance with the state of the logic key and the business logic which may result in local actions and/or server based actions. For a server oriented implementation, the server may include logic to operate on the data based on the state of the Logic Key. Finally, for implementations that are application client and server based, the business logic may be shared between the application client 110 and the server 120. In either case, when defining and implementing a Logic Key, additional JavaBeans, including Session Beans and Logic Beans may be necessary in order to implement the functions of the Logic Key.

Thus, it will be appreciated that a general client-server application system can be created for application to the general populous. The application can be utilized by a variety of clients for different entities. If a particular entity then desires the application client to be customized in a particular manner, the entity can request such customizations to be implemented through the use of a Logic Key.

Use of Logic Key

EXAMPLE 1

Virtual Account

As a specific and non-limiting example of the Logic Key being implemented in the exemplary accounting system, the use of a Logic Key to create a virtual account is presented. An entity or organization that has a single checking account but multiple operations can establish a virtual account to share the checking account and have all activity associated with financial transactions across the organization to be properly attributed and reconciled with the various operations.

Often, in accounting systems, the accounts, books and ledgers for a particular entity are separated into segments. The segments can be based on a variety of factors including the nature of the products or services, nature of production, type or class of customers for the products or services, the method used to distribute the products or provide the services, the geographic region for aspects of the business including economic and political conditions, special risks, exchange control regulations, underlying currency risks, etc. In general, a segment is a component of a business that can be utilized to track data related to the business, such as revenues and costs related to operations as a non-limiting example. The exemplary accounting system manages financial information for a segment's activities and performance.

In addition, within an accounting system, a particular element that is to be tracked may also be referred to as an account. For instance, a company may separate into segments individual business units as described above, or within a business or business unit, separate accounts based on aspects of the business. Table 1 illustrates a non-limiting example of accounts that can be set up in a general ledger for aspects of the business or business unit.

TABLE 1

| ACCOUNT NAME | ACCOUNT NUMBER |
|---|---|
| Cash | 10200 |
| Contributions | 40000 |
| Postage | 80000 |
| Office Supplies | 72000 |
| Cleaning Supplies | 75000 |
| Electricity | 77000 |

In operation, an organization will select the virtual account Logic Key to apply to an account. An exemplary implementation of a user interface for this feature is illustrated in FIG. 3 with reference to drop down menu item 320. As previously noted, the business logic associated with the virtual account would be developed for this particular Logic Key and as such, when the organization loads the accounting system, the underlying accounting data, as well as the business logic for the virtual account are loaded into the application client upon initialization.

In the presented example, the use of segments allows for the data to be dissected into any type of way that is desired. As a non-limiting example, the data can be dissected into geographic regions. Segment 002 may include all 50 states. To track operations in each state, the data can be pulled out for each state separately. As another non-limiting example, a segment can be used to dissect data as restricted, unrestricted or partially restricted. In accounting scenarios, typically a parent child relationship is created for segments. However, in the environment presented herein, the segments utilized to dissect the data can be completely independent or unrelated to each other. Within each segment, the accounting system includes at least one account. In a particular example, segment 1 is a general ledger. In implementation, the Logic Key applies to any account number within any segment. The Logic Key imparts intelligence with regards to a specific account number. The incorporation of the Logic Key conveys intelligence to any account within the accounting system.

The virtual account ensures automatic balancing among and across all segments and within each segment without requiring the operator to make accounting entries to keep the system in balance. To illustrate the operation of the virtual account, consider a charitable organization that has the funds as listed in Table-2

TABLE 2

| Fund Name | ID |
| --- | --- |
| Mission | MIS |
| Capital | CAP |
| Operating | OPR |
| Charity | CHA |
| Annex | ANX |
| Kitchen | KIT |
| Youth | YOU |
| Children | CHI |
| Benevolence | BEN |

Further, consider that the organization also includes the sub-funds presented in Table-3.

TABLE 3

| Sub-Fund Name | ID |
| --- | --- |
| Discipleship Training | 100 |
| VBS | 200 |
| Russia Trip | 300 |
| Repairs | 400 |
| Heart Ministries | 500 |
| Tom Hall Fund | 600 |
| Penfield Ministries | 700 |
| Awana's | 800 |

Each of these business activities and funds operate under a single organization that has a single checking account. In application of the virtual account, suppose the cash account is marked as a virtual account. As cash is received into or disbursed from the organizations, the transactions are recorded against the overall accounting system but, each of the activities/funds that draw from the account will also receive allocations of the cash transaction.

FIG. 5 is a table showing the allocation of funds received into the organization as cash transactions. As can be seen, looking at the details for Payment #1001 for electricity 505, the electricity bill was $896.00. The cost for the electricity is debited against the cash segment 10200 but it is allocated across two funds, 10200-ANX for $458.00 and 10200-KIT for $438.00. Further, the appropriate segment for each fund also shows a credit for 77000-ANX and 77000-KIT. Similarly, Payment #1002 to John Doe 510 of $270 has been debited against the cash account 10200 and has been allocated across four funds 10200-ANX-800 (a sub fund), 10200-KIT, 10200-ANX and 10200-YOU-700 (a sub-fund). Likewise, the appropriate segment for each fund and sub-fund where applicable shows a credit respectively as 72000-ANX-800 (office supplies), 75000-KIT and 75000-ANX (cleaning supplies), and 70000-YOU (postage). Thus, when a check is received, in this particular example to be recorded as a cash receipt, the check can be broken down in the applicable activities/funds. The distribution is allocated in the Receipt Details screen as illustrated in FIG. 6.

Advantageously, by earmarking the cash account 10200 as a virtual account (i.e., FIG. 3), the accounting system operates to maintain automatic balancing for the overall organization as well as each of the funds within the organization. The business logic developed in support of the virtual account Logic Key, when activated (i.e. via a drop down menu as illustrated in FIG. 3 as a non-limiting example), maintains the information necessary to generate balance sheets for each of the funds. FIG. 6-FIG. 20 illustrate exemplary balance sheets that can be automatically generated by the accounting system for an account that is marked with the virtual account Logic Key. A balance sheet can be generated for the overall organization as well as a balance sheet for each of the funds. In addition, balance sheets can also be generated for each sub-fund as well as other balance sheets based on other aspects of the funding, such as restricted, unrestricted, temporarily restricted, etc.

Thus, it should be appreciated from this example, that a highly complex accounting function is easily created within the confines of the accounting system by simply tagging an account with a virtual account Logic Key. Once an account is tagged as a virtual account, any checks posted to that account or payments made from that account will automatically be broken down into all activities and all funds associated with that account in accordance with the business logic. In addition, the integrity of the overall account is maintained and available for viewing. A user can view balance sheets, income statements, etc. for any activity or sub-activity as well as the complete operation of the entity and integrity and consistency is maintained across the operation. The business logic associated with the complexities is automatically loaded into the application client, as well as the report generations. As a web-based system, the functionality developed for the virtual account can be made available to other users of the accounting system or, if the functionality is proprietary, then it can be restricted and be available only to authorized users.

Use of Logic Key

EXAMPLE 2

Long Term Loans

As another non-limiting example of the Logic Key, consider requirements that may be imposed upon a borrower by a lender for approval of a long term loan. For instance, if an entity obtains a line of credit for $500K, for example, the lender may want to ensure that the risk associated with this loan is minimized. As such, the lender may require that the borrower meet certain guidelines or restrictions, such as ensuring a minimum amount of working capital and maintaining limits on accounts receivable. As a more specific example, suppose the lender required the borrower to maintain a working capital of $25K and that only 20% of the accounts receivable could be aged more than 60 days. A Logic Key could be created to monitor and/or police the account and ensure that these restrictions are complied with by the user.

In operation, the restrictions would be provided to the accounting system organization to define the Logic Key and generate the business logic to implement the restrictions. The business logic could be used to create margins to help ensure that the restrictions are not violated and to provide alarms when thresholds are being approached. For instance, if a certain percentage of the accounts receivable are out of compliance (aged more than 60 days in the present example), such as 10% as a non-limiting example, the business logic could generate a notice to the account manager to sound a warning that the accounts receivables should be policed as the 20% mark is being approached. The account manager can then take remedial measures. As another non-limiting example, reminder notices could be automatically sent to vendors or parties associated with accounts that are not in compliance. Further, the business logic may include a threshold trigger that would send a notice to the loan officer and/or financial institute underwriting the loan.

As such, it will be appreciated that such a function allows the general accounting operation to proceed as normal and the business logic works in the background, or independent from the normal accounting functions, to monitor for compliance and trigger notices when the account is moving towards non-compliance.

Generation of Business Logic

As previously described, the entity maintaining the system, such as the accounting system in the above-provided example, is requested to develop the business logic for the Logic Key and operates to do so based on a definition of the operating requirements. It should also be appreciated that some of the generation of the business logic could also be performed by a user of the system. For instance, in one embodiment, a set of Logic Keys may be provided to the user of the system as a library of functionality. The user then has the ability to pick and choose which Logic Keys to apply to the system. In addition, one or more of the Logic Key functionalities within the library may also include open-ended definitions or parameters. For instance, looking again at the long term loan compliance example (Example 2), the library may include a list of typical activities and conditions that could be monitored. Thus, if the user selects the accounts receivable compliance Logic Key, the user may be prompted to enter a percentage and an age restriction. Another condition may include ensuring that the outstanding account receivables are not centered on a single vendor, or a particular vendor that has been earmarked as a payment risk. Thus, the user can select the Logic Key for this monitoring activity and provide additional information about vendors that have extraordinary high activity and good payment track records to be excluded from the list.

Use of Logic Key

EXAMPLE 3

Partnership Distributions

As yet another example of the use of the Logic Key in the accounting system, consider the operation of a partnership in which debits and credits are to be allocated to the partnership members in accordance with a complex formula. The accounting system can be utilized to keep track of the overall financial operations of the partnership. However, by tagging the accounts receivable with a Logic Key for client based distributions, as checks are received, the funds can be allocated to the various members in accordance with business logic. For instance, suppose the partnership operates to place 10% of all receivables into a general bucket for partnership expenses, 15% to the member that originated the client, 10% to the member that manages the client, 5% to the member that reviews the billing for the client, and the remaining 45% to the member performing the work or to the general bucket if an employee performed the work. As a received payment is coded into the system, the business logic associated with the Logic Key and the account receivables account automatically performs the complex formula so that the appropriate allocations are made. The overall credit is processed as in the overall general ledger but, each member in the partnership can be considered as a fund or activity. Thus, a general ledger is automatically kept for each member in the partnership to enable individual accounting at the member level as well as at the partnership level.

Use of Logic Key

MISCELLANEOUS EXAMPLES

It should be appreciated that the above-listed examples are non-limiting examples to illustrate the use of the Logic Key in an accounting system. Other examples of using the Logic Key are also anticipated. A few additional non-limiting examples are provided below. For instance, a Logic Key can be applied to ensure compliance with GAAP or IFRS regulations. The Logic Key can be applied to any financial concept. The Logic Key can be used to monitor internal financial ratios and provide an alert if they are out of range. Application of the Logic Key to a geographic segment could be used to calculate the additional cost of raw materials that are not received from the geographic region due to shipping interruption. The Logic Key could be used to implement a risk assessment function as well. The Logic Key could be used to apply business logic to a geographical location segment and business activity segment to fixed assets placed in those areas to track fixed asset concentrations and location of those assets (construction waste containers tracking). Thus, as assets are moved from place to place, the system could monitor the locations of the assets and if a risk scenario is created, then to generate and alert to invoke remedial measures. As a particular example, the assets may include geo-tracking equipment that may automatically report the locations of the equipment to the tracking application. As the locations of the assets are received, the tracking application is updated to show the current location of the assets. Such an application could be selectively enhanced by the use of a Logic Key that would invoke a risk assessment functionality. The risk assessment functionality could be based on various algorithms that would define an increased risk. As non-limiting examples, the algorithm could identify a risk as a large number of assets being located in small region, expensive assets being located in an area that is known to be subject to vandalism, equipment being conjugated in a flood plain during a rainy season or upon determining that a hurricane is approaching the area, etc.

In a purchasing system, the concept of the Logic Key could be used to implement specific functionality for a user as well. For instance, the business logic for monitoring exchange rates, production requirements, etc., could be implemented for a particular product, production plant, etc. When the account is tagged as being associated with the Logic Key, then notices to the purchasing agent can indicate when exchange rates should invoke order changes. Further, if the system is equipped to automatically order supplies as production ensues, the system could allocate orders based on current exchange rates.

As yet another example, the user could have a Logic Key that works only if the general ledger account number plus the account name/number in another segment is used. For example, account number 15,250 in segment #1 is a container asset plus account name Egypt in segment #3, then usage of any general ledger account that includes 15250-x-Egypt-x-x . . . will invoke the Logic Key to perform a predetermined process, such as risk monitoring. Also, the Logic Key example immediately above can be further refined by referencing the date of purchase or a range of dates for all assets in account #1 (container assets). This demonstrates that the Logic Key may be highly refined and is not limited to information contained within accounts of any particular segment only. This displays the capacity of achieving a high level of intelligence in the business system which may be implemented with precision.

Thus, it will be appreciated that the Logic Key operates to add functionality into a web-based application and/or a client-server application without having to modify the underlying operations of the web-based application, the client-server application and/or the application client. Aspects or embodiments of the Logic Key functionality can be incorporated into a variety of settings ranging from thin clients to fat clients, Internet-based applications or other network based applications, and even stand-alone applications that can be configured to specific user functionality. By providing business logic for one or more Logic Keys, the user can access customized functionality, or specialized functionality for the system. The system provider can still service other users with the standard capabilities and provide enhanced or modified capabilities to particular users. Further, in an accounting system, for example, a complete accounting package can be provided for general accounting functionality but, specific needs for particular business or business sectors can be addressed by adding functionality and capabilities through the use of the Logic Keys.

In the description and claims of the present application, each of the verbs, "comprise", "include" and "have", and conjugates thereof, are used to indicate that the object or objects of the verb are not necessarily a complete listing of members, components, elements, or parts of the subject or subjects of the verb.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

It will be appreciated by persons skilled in the art that the present invention is not limited by what has been particularly shown and described herein above. Rather the scope of the invention is defined by the claims that follow.

What is claimed is:

1. A processor implemented method of providing, via a client-server architecture, a web application that can include customized functionality without disrupting the underlying operation of the web application, the method comprising the acts of:
    accessing and making available to a client a version of foundational business logic that implements a standard functionality in a web application, the standard functionality associated with the underlying operation of the web application;
    rendering application content for the web application;
    accessing and making available to the client, based on an activated logic key associated with the client, at least one of a plurality of supplemental business logic packages that, each, implement a specific customized functionality in the web application;
    receiving at the server, modified data from the client generated by the at least one supplemental business logic package;
    running the version of the foundational business logic and the at least one supplemental business logic package made available to the client;
    rendering data fields associated with the foundational business logic and rendering additional data fields associated with the at least one supplement business logic package;
    examining the credentials of a user of the web application;
    providing access to the specific customized functionality associated with the at least one supplemental business logic package only to the user if it satisfies authorization credentials; and
    storing the modified data received at the server into a database;
    wherein the version of foundational business logic available to the client is compatible with each of the plurality of supplemental business logic packages; and
    wherein the optional act of running the at least one supplemental business logic package does not necessitate any change to the version of foundational business logic made available to the client.

2. The method of claim 1, wherein the act of accessing and making available to the client at least one of a plurality of supplemental business logic packages comprises the acts of:
    receiving a functional definition associated with the activated logic key;
    creating an algorithm to perform the defined functions; and
    including the algorithm in at least one of a plurality of supplemental business logic packages.

3. The method of claim 1, additionally comprising the act of receiving, via the rendered data fields and the additional data fields, the modified data from the client.

4. A system for providing a web application that can include customized functionality without disrupting the underlying operation of the web application, the system comprising:
    a database
    a client built on an architecture comprising:
        a memory element; and
        a processor communicatively coupled to the memory element, the database, and the server, the processor, in response to executing program instructions contained in the memory element, being configured to:
            run the version of the foundational business logic and the at least one supplemental business logic package made available to the client;
            render application content for the web application;
            examine the credentials of a user of the web application; and
            provide access to the specific customized functionality associated with the at least one supplemental business logic package only to the user if it satisfies authorization credentials; and
    a server built on an architecture comprising:
        a memory element; and
        a processor communicatively coupled to the memory element, the database, and the client, the processor, in response to executing program instructions contained in the memory element, being configured to:
            access and make available to the client a version of foundational business logic that implements a standard functionality in a web application, the standard functionality associated with the underlying operation of the web application;
            access and make available to the client, based on an activated logic key associated with the client, at least one of a plurality of supplemental business logic packages that, each, implement a specific customized functionality in the web application;
            receive modified data from the client generated by the at least one supplemental business logic package; and
            store the modified data received at the server into the database;
    wherein the version of foundational business logic available to the client is compatible with each of the plurality of supplemental business logic packages; and
    wherein running the at least one supplemental business logic package does not necessitate any change to the version of foundational business logic made available to the client.

5. The system of claim 4, wherein the processor of the client is additionally configured to render data fields associated with the foundational business logic and render additional data fields associated with the at least one supplement business logic package.

6. system of claim 4, wherein the processor of the server is additionally configured to receive, via the rendered data fields and the additional data fields, the modified data from the client.

7. The system of claim 4, wherein the processor of the server is additionally configured to:
   receive a functional definition associated with the activated logic key;
   create an algorithm to perform the defined functions; and
   include the algorithm in at least one of a plurality of supplemental business logic packages.

* * * * *